US007488363B2

(12) United States Patent
Jeong et al.

(10) Patent No.: US 7,488,363 B2

(45) Date of Patent: Feb. 10, 2009

(54) DUST COLLECTION UNIT OF VACUUM CLEANER

(75) Inventors: Hoi Kil Jeong, Changwon-si (KR); Man Tae Hwang, Changwon-si (KR); Young Ho Kim, Changwon-si (KR); Jung Bae Hwang, Daegu (KR); Min Park, Haewundae-gu (KR)

(73) Assignee: LG Electronics, Inc., Seoul (KR)

( * ) Notice: Subject to any disclaimer, the term of this patent is extended or adjusted under 35 U.S.C. 154(b) by 551 days.

(21) Appl. No.: 11/232,859

(22) Filed: Sep. 23, 2005

(65) Prior Publication Data

US 2006/0137307 A1 Jun. 29, 2006

(30) Foreign Application Priority Data

Dec. 27, 2004 (KR) ...................... 10-2004-0113377

(51) Int. Cl.
*B01D 45/12* (2006.01)

(52) U.S. Cl. ............................ 55/337; 55/343; 55/346; 55/426; 55/429; 55/DIG. 3

(58) Field of Classification Search ................... 55/337, 55/343, 346, 349, 426, 429, 459.1, DIG. 3
See application file for complete search history.

(56) References Cited

U.S. PATENT DOCUMENTS

| | | | |
|---|---|---|---|
| 4,826,515 A | 5/1989 | Dyson | |
| 5,893,938 A | 4/1999 | Dyson et al. | |
| 7,361,200 B2 * | 4/2008 | Oh et al. | 55/343 |
| 2004/0088956 A1 | 5/2004 | Gammack | |

FOREIGN PATENT DOCUMENTS

| | | | |
|---|---|---|---|
| DE | 201 09 699 | U1 | 11/2001 |
| EP | 1036536 | A | 9/2000 |
| GB | 2326360 | A | 12/1998 |
| GB | 2 399 780 | A | 9/2004 |
| JP | 50-101012 | | 7/1975 |
| JP | 2002326041 | | 11/2002 |
| RU | 2 200 451 | C1 | 3/2003 |
| RU | 2 236 813 | C2 | 9/2004 |
| WO | WO 03/030702 | A2 | 4/2003 |

* cited by examiner

*Primary Examiner*—Robert A Hopkins
(74) *Attorney, Agent, or Firm*—McKenna Long & Aldridge LLP

(57) ABSTRACT

A dust collecting unit of a vacuum cleaner is provided. The dust collecting unit includes: a plurality of storing chambers and a plurality of filtering chambers provided in the inside of a multi-cyclone dust collecting unit. To improve reliability of the product, the storing chambers and the filtering chambers are integrally formed as one body.

19 Claims, 9 Drawing Sheets

DUST COLLECTION UNIT OF VACUUM CLEANER

BACKGROUND OF THE INVENTION

1. Field of the Invention

The present invention relates to a vacuum cleaner, and more particularly, to a dust collecting unit of a vacuum cleaner that can be manufactured conveniently and simply. Particularly, the present invention relates to a dust collecting unit of a vacuum cleaner such that a collection body in the inside of the dust collecting unit is manufactured in an integral type by a single injection process, so that the manufacturing process is simple and thus manufacturing costs reduce.

2. Description of the Related Art

A vacuum cleaner is used to clean a room or other spaces by sucking air containing foreign objects and filtering the foreign object using vacuum pressure generated therein.

In the meantime, the vacuum cleaner has a dust collecting unit of a predetermined shape mounted within the vacuum cleaner and a filtering device installed in the dust collecting unit, for filtering foreign objects in order to filter foreign objects in sucked air.

The typical filter is formed of porous material so that the foreign objects are filtered while the air containing the foreign objects passes through the filter.

However, since it is inconvenient to reuse the filter formed of the porous material and it is difficult to clean the filter, in recent years, a cyclone unit has been widely used. However, the cyclone unit has a problem in that it cannot filter micro-scale foreign objects. Therefore, an additional porous filter formed of the porous material has been associated with the cyclone unit.

However, when the porous filter is combined with the cyclone unit, the problem of periodically cleaning the filter still remains. When the foreign objects are implanted in the porous filter, an airflow rate is reduced, thereby deteriorating the operational efficiency of the vacuum cleaner.

To solve the above problems, a solution in which a plurality of cyclones are produced in the inside of a single dust collecting unit instead of using a porous filter in the inside of the dust collecting unit to allow even fine dusts to be completely filtered, has been suggested recently. Such a dust collecting unit may be called a multi-cyclone dust collecting unit.

In the meantime, since airflow is switched to several directions to produce a plurality of cyclones in the inside of the dust collecting, the inner structure of the multi-cyclone dust collecting unit is complicated. Therefore, it is general that a plurality of parts are coupled to each other to manufacture the multi-cyclone dust collecting unit.

However, when the dust collecting unit is manufactured by a process of assembling a plurality of parts, the possibility that defect occurs in the finished product increases as much as that and a labor of an operator increases.

SUMMARY OF THE INVENTION

Accordingly, the present invention is directed to a dust collecting unit of a vacuum cleaner that substantially obviates one or more problems due to limitations and disadvantages of the related art.

An object of the present invention is to provide a dust collecting unit of a vacuum cleaner capable of improving reliability of the product by reducing parts of the dust collecting unit.

Another object of the present invention is to provide a dust collecting unit of a vacuum cleaner capable of improving accuracy of the product and dust collecting efficiency of the dust collecting unit by manufacturing the inner construction of the product using minimum parts.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dust collecting unit of a vacuum cleaner, including: a collection body having a plurality of foreign object filtering chambers for filtering foreign objects and a foreign object storing chamber for storing foreign objects filtered from the foreign object filtering chambers; a sealing member for closing a lower portion of the collection body; a separation plate formed horizontally at the collection body and having an exhaust member disposed at an upper side of the collection body, the exhaust member guiding airflow; a first filtering chamber disposed in an inner space of an inner wall extending to a downward direction of the separation plate; a second storing chamber defined as a space between the inner wall and an intermediate wall spaced at an outside of the inner wall; a first storing chamber defined as an inner space of an outer wall spaced at an outside from the intermediate wall; and a second filtering chamber extending vertically from the separation plate and having a lower end received in an inside of the second storing chamber, the storing chamber and the filtering chamber being formed as one body.

In another aspect of the present invention, there is provided a dust collecting unit of a vacuum cleaner including: a separation plate for partitioning a space horizontally; a collection body having, as one body, a first foreign object filtering chamber formed in a lower side of the separation plate and having an upper wall defined by the separation wall, a plurality of second foreign object filtering chambers formed at an outside of the first foreign object filtering chamber, a first foreign object storing chamber formed in a lower portion of the first foreign object filtering chamber, and a single foreign object storing chamber formed in a lower portion of the second foreign object filtering chamber; a filter fixed as a separate member at a central portion of the separation plate; a blocking member formed in a lower side of the filter, for partitioning the first and second foreign object storing chambers; and an exhaust member for guiding airflow discharged from the foreign object filtering chamber.

In a further another aspect of the present invention, there is provided a dust collecting unit of a vacuum cleaner including: a collection body having, as one body, a separation plate for partitioning a space horizontally, a first foreign object filtering chamber formed in a lower side of the separation plate and having an upper wall defined by the separation wall, a plurality of second foreign object filtering chambers formed at an outside of the first foreign object filtering chamber, a first foreign object storing chamber formed in a lower portion of the first foreign object filtering chamber, and a single foreign object storing chamber formed in a lower portion of the second foreign object filtering chamber; a communication cavity formed in a central portion of the separation plate and through which air from which foreign objects has been filtered by the first foreign object filtering chamber is discharged; a filter for filtering relatively large foreign objects contained in air discharged from the communication cavity; a blocking member formed in a lower side of the filter, for partitioning the first and second foreign object storing chambers; and an exhaust member for guiding airflow discharged from the foreign object filtering chamber.

According to the dust collecting unit of the vacuum cleaner, problems of an abnormal product, accuracy deterioration, and manufacturing cost increase can be solved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
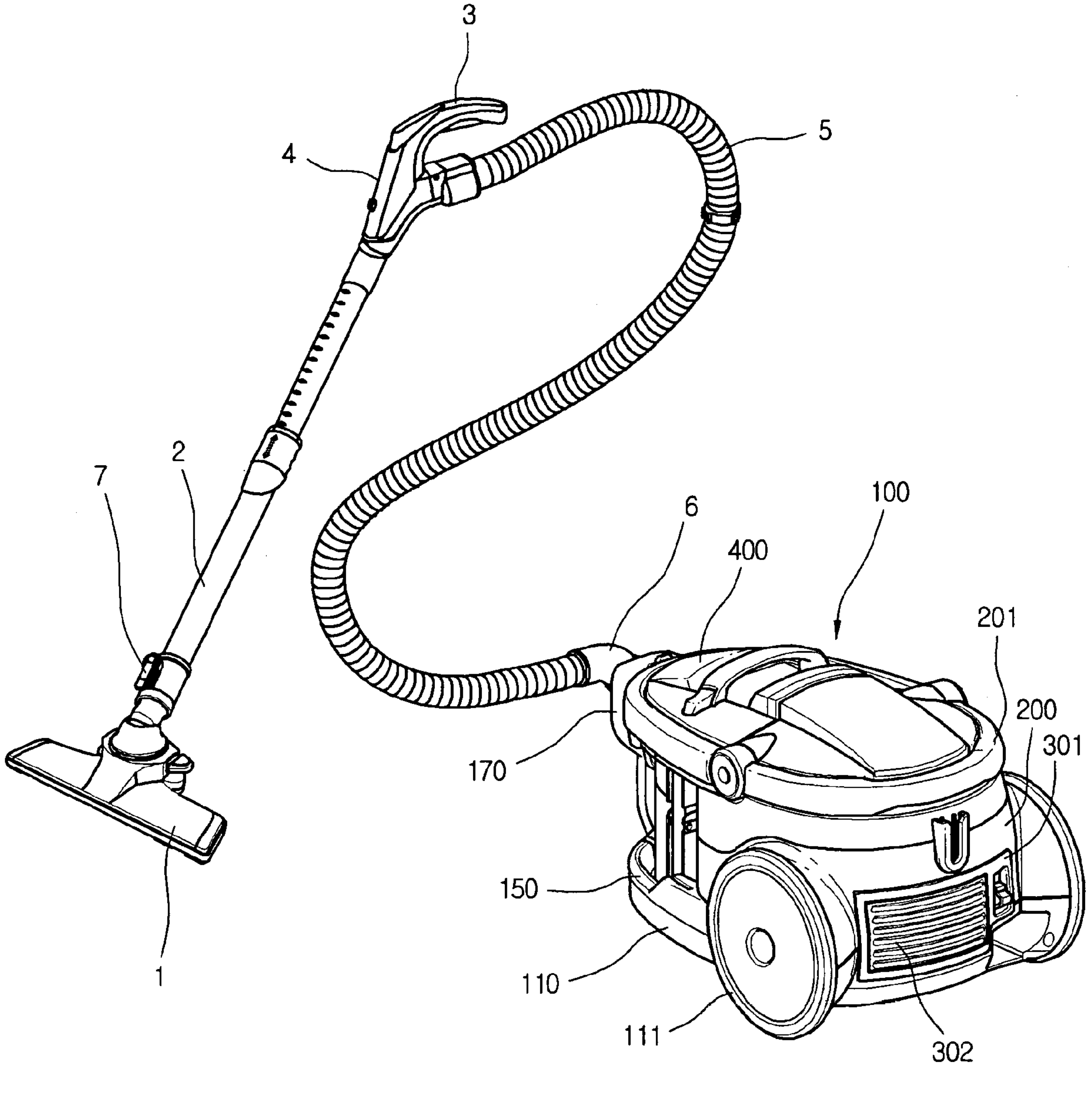
FIG. 1 is a perspective view of a vacuum cleaner according to the present invention.

FIG. 1 shows a vacuum cleaner to which a dust collection unit according to the present invention can be applied.

Referring to FIG. 1, a vacuum cleaner includes a main body 100 and a suction passage connected to a suction portion of the main body 100. Disposed in the main body 100 are a suction fan (not shown), and a dust collection unit (not shown). Therefore, the sucked air is exhausted out of the main body 100 after foreign objects contained in the sucked air are filtered.

The suction assembly is provided to suck the air containing the foreign objects when sucking force is generated in the main body 100.

That is, the suction assembly includes a sucking nozzle body 1 for sucking the air containing the foreign objects using a powerful airflow, an expandable tube 2 extending from the sucking nozzle body 1 and expandable and contractible by a user, an operation handle 3 provided on a distal end of the expandable tube 2, a manipulation unit 4 provided on a front portion of the operation handle 3, a flexible tube 5 extending from the operation handle 2, a connector 6 connecting a distal end of the flexible tube 5 to the main body 100, a pipe rest 7 on which the expandable pipe 2 can be supported and suspended when the vacuum cleaner is not used.

The connector 6 functions as a connection terminal transmitting a manipulation signal inputted by the user through the manipulation unit 4 to the main body 100 as well as a passage through which the sucked air is introduced into the main body 100. That is, a plurality of electric connection terminals are provided on a proximal end of the connector 6. However, the electric connection terminals are required only when the manipulation unit 4 is provided on the suction assembly. That is, when the manipulation unit 4 is provided on the main body 100, the electric connection terminals are not provided on the connector 6. In this case, the connector 6 may simply function as an air introducing passage.

The air introduced into the main body 100 through the suction assembly is exhausted out of the main body 100 after the foreign objects contained in the introduced air are filtered. The main body 100 of the vacuum cleaner will be described in more detail hereinafter with reference to FIGS. 1 and 2.

Figure 2:
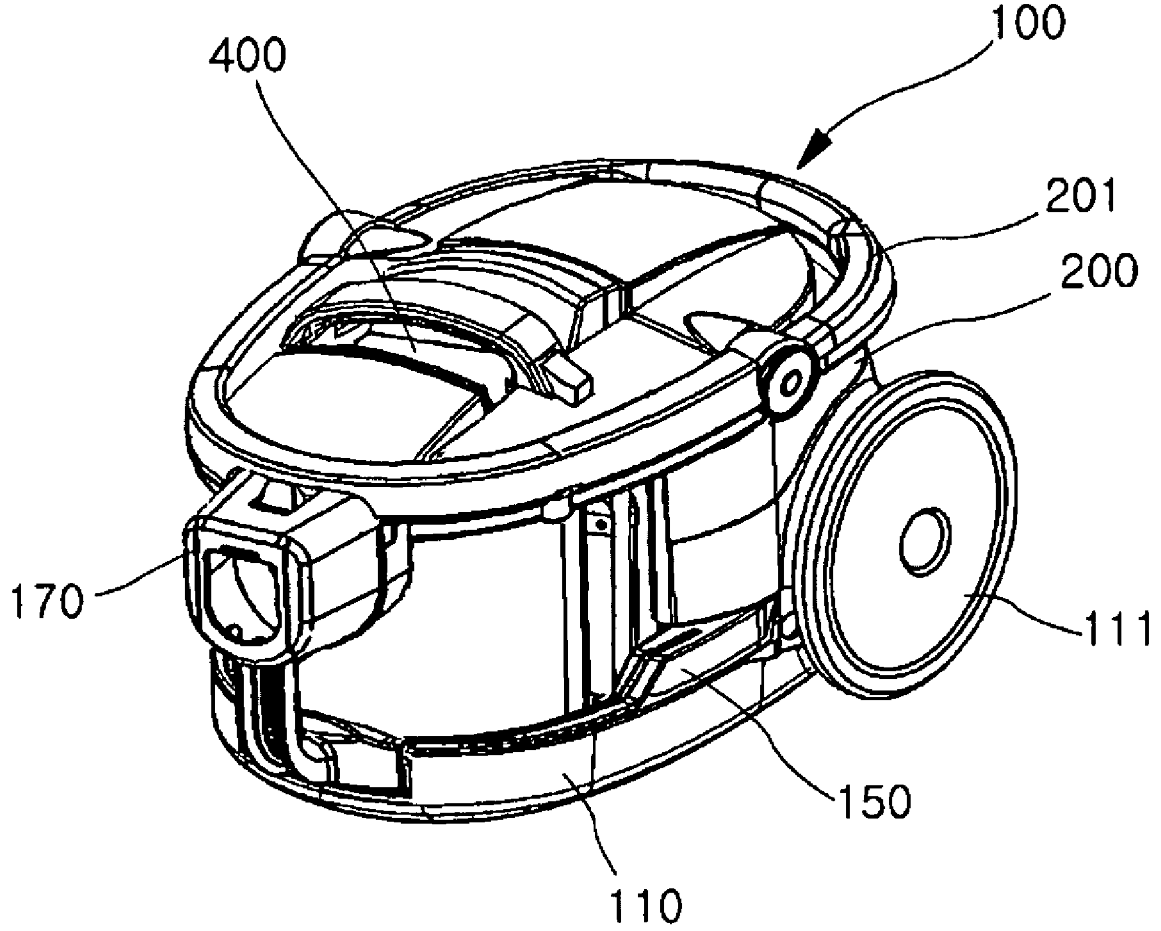
FIG. 2 is a front perspective view of a main body of a vacuum cleaner according to the present invention.

FIG. 2 shows the main body of the vacuum cleaner.

Referring to FIGS. 1 and 2, the main body 100 includes a first base 110 defining a lower portion of the main body 100, a second base 150 disposed on the first base 110, a cover 200 disposed on the second base 150, wheels 111 provided on both rear-side portions of the cover 200 to make it easy to move the main body 100, and a front support 70 for supportedly fixing the cover 200 and the first and second bases 110 and 150.

The connector 6 is connected to the front support 170 to allow the outer air to be introduced into the main body 100. The support 170 securely supports the front portion of the main body 100.

The second base 150 is provided right above the first base 110 to improve the ornament of the main body and enhance the rigidity of the lower portion of the main body.

An exhaust cover 301 provided with a plurality of exhaust holes 302 is provided on a rear portion of the cover 200 to exhaust clean air. A carrying handle 201 is pivotally provided on a top surface of the cover 200. When a user intends to carry the main body 100, the user pivots the carrying handle 201 in a vertical position and conveniently carries the main body 100 with his/her hand grasping the carrying handle 201.

A dust collection unit 400 is disposed in the main body in rear of the front support 170 and a cyclone member (not shown) is received in the dust collection unit to generate cyclone airflows and filter the foreign object contained in the air.

Figure 3:
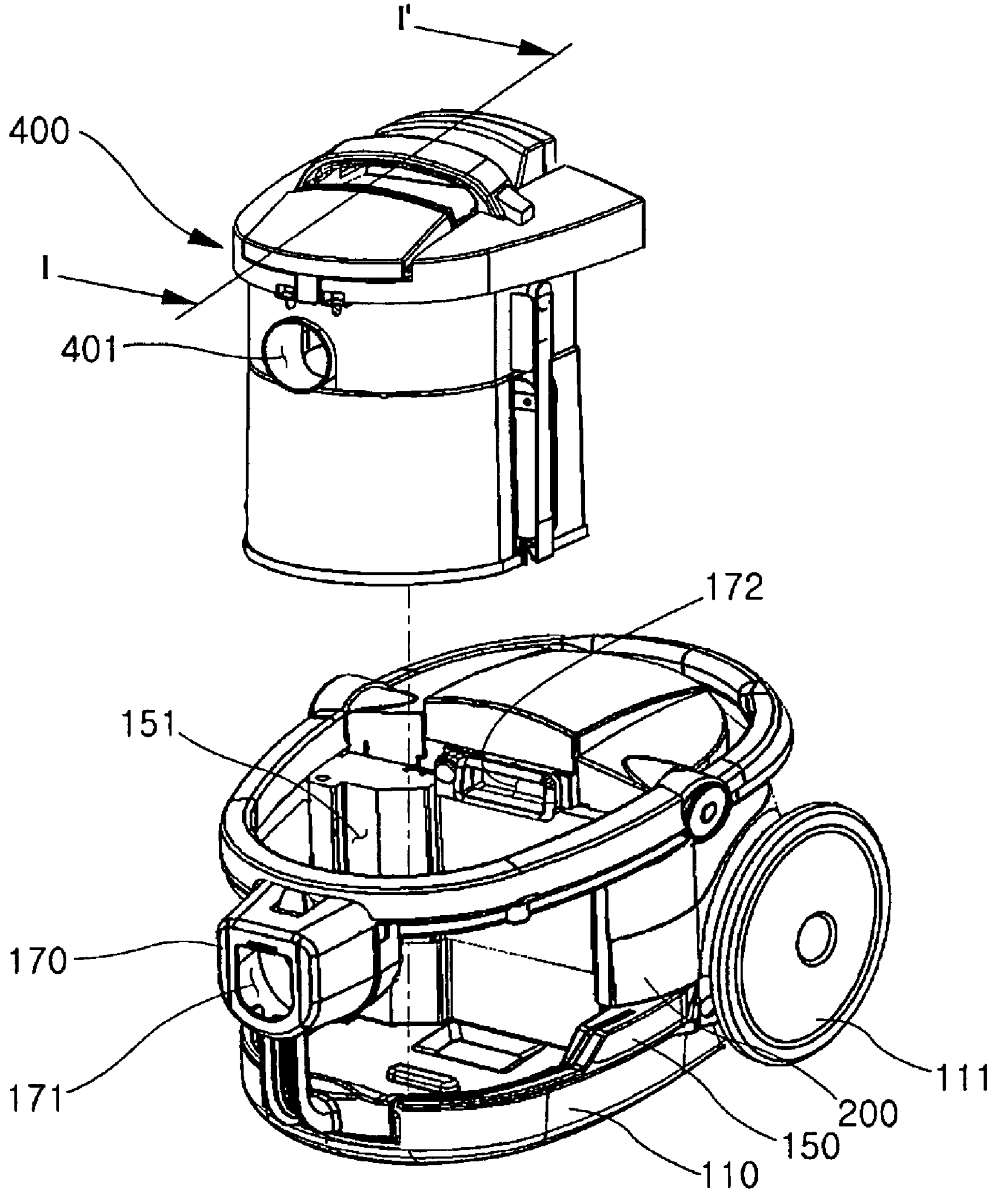
FIG. 3 is separated perspective view of a dust collecting unit in a vacuum cleaner according to the present invention.

As shown in FIG. 3, the dust collection unit 400 is vertically installed in a receiving chamber 151 defined in the main body 100. That is, the dust collection unit 400 may be installed in the receiving chamber 151 by being pushed downward and separated from the receiving chamber 151 by being pulled upward.

The front support 170 is provided with a first air intake hole 171 and the dust collection unit 400 is provided with a second air intake hole 401 corresponding to the first air intake hole 171. The dust collection nit 400 is further provided with an exhaust hole (not shown) opposite to the second air intake hole 401. The exhaust hole is aligned with a third air intake hole 172 formed toward the motor so that the air cleaned by passing through the collection unit 400 is exhausted toward the motor side.

Particularly, the third air intake hole 172 is formed in a rectangular shape lengthwise in a horizontal direction so as to reduce the size of the main body 100 and allow the air to effectively flow.

Figure 4:
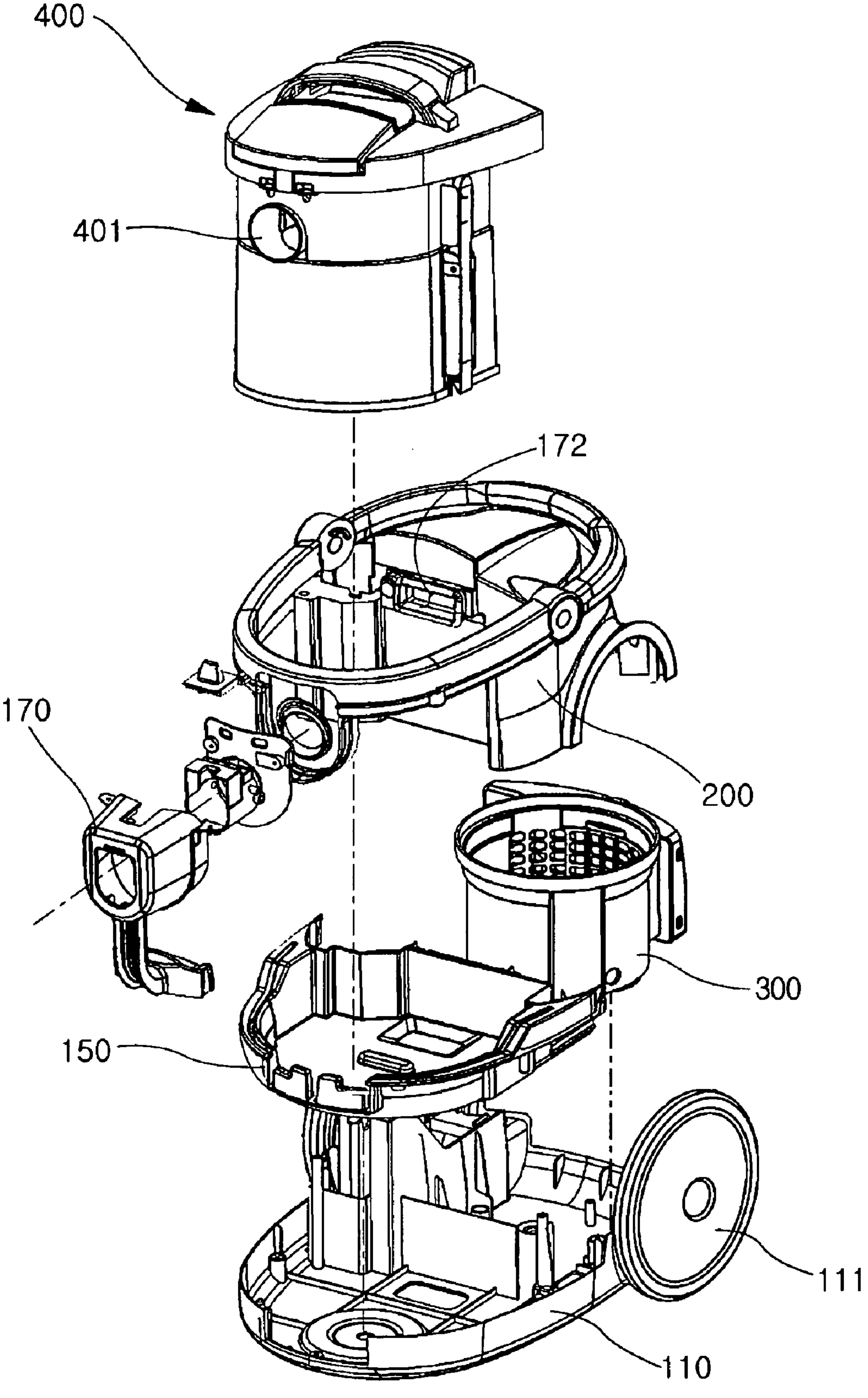
FIG. 4 is an exploded perspective view of a main body of a vacuum cleaner according to the present invention.

FIG. 4 shows the main body of the vacuum cleaner.

Referring to FIG. 4, the second base 150 is disposed on a rear-top portion of the first base 110. A motor housing 300 is disposed on a rear portion of the first base 110. Then, the cover 200 is coupled to the first and second bases 110 and 150 to define the main body 100.

Here, the cover 200 is coupled to the first and second bases 110 and 150 in a state where the front support 170 is coupled to the cover 200. A flowing direction of the air introduced into the motor housing 300 through the third air intake hole 172 is changed by 90° in a vertical direction and is then changed in a horizontal direction so that the air can be exhausted rearward.

Figure 5:
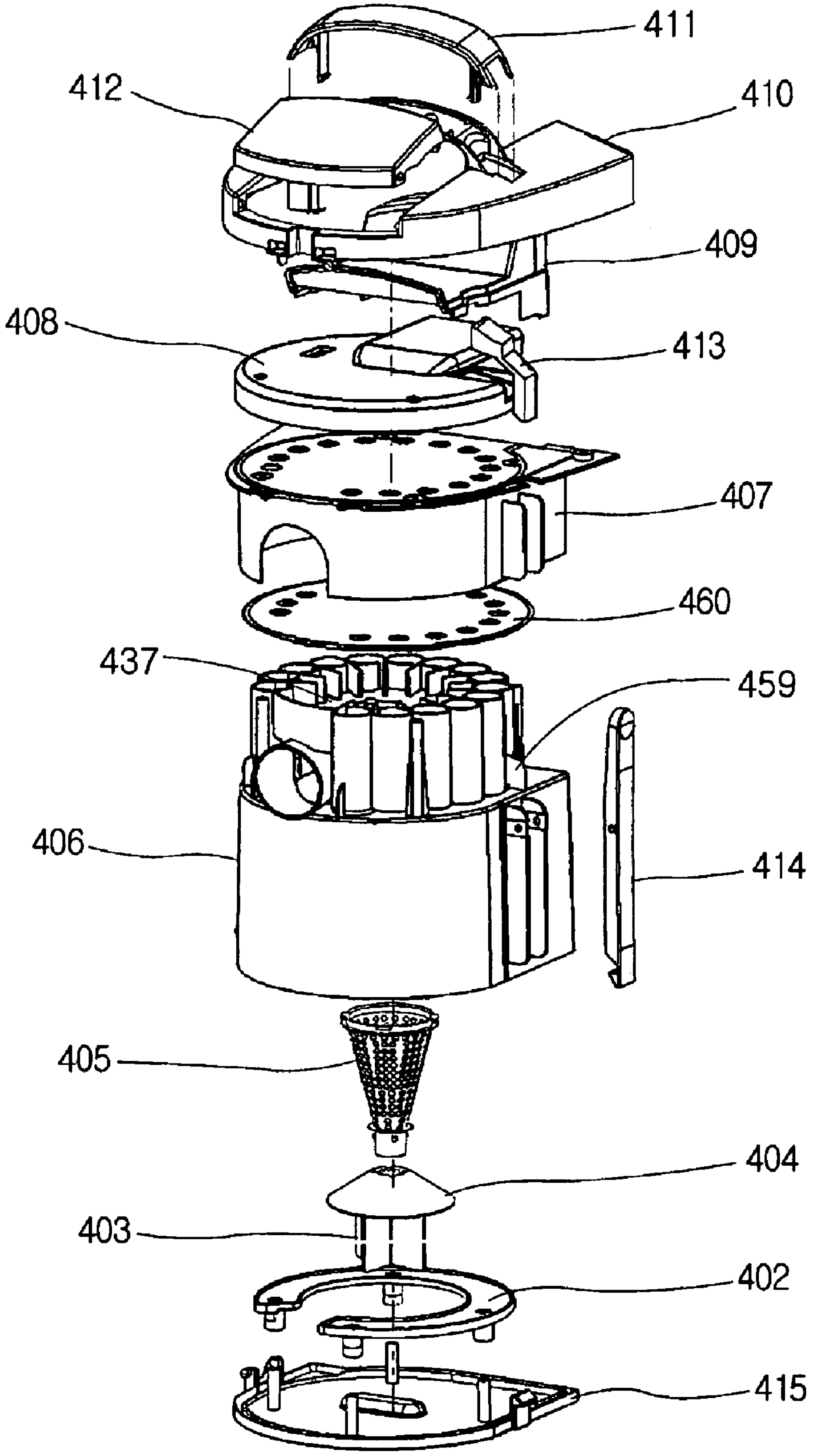
FIG. 5 is an exploded perspective view of a dust collecting unit according to the present invention.

FIG. 5 shows the dust collection unit according to an embodiment of the present invention.

Referring to FIG. 5, the inventive dust collection unit 400 does not use a porous filter such as a sponge. That is, the inventive dust collection unit 400 is designed to filter the foreign objects using cyclone airflows. The cyclone airflow is generated at least two chambers separated from each other so that even the micro-scale dusts contained in the air can be filtered. This will be described in more detail hereinafter.

The dust collection unit 400 includes a collection body 406 provided with a plurality of filtering chambers (refer to the reference numerals 423 and 424 of FIG. 7) for filtering the foreign objects and a plurality of storing chambers (refer to the reference numerals 417 and 416 of FIG. 7) for storing the filtered foreign objects, chamber sealing members 402 and 415 provided to seal a bottom of the collection body 406 and prevent the foreign objects stored in the storing chambers 416 and 417 from leaking, an air exhaust member 407 disposed on the collection body 406 to guide the flow of the air exhausted from the collection body 406, a gap forming member 408 providing a predetermined gap above the exhaust member 407 to allow the air exhausted from the exhaust member 407 to flow in a direction, and a cover assembly disposed on the gap forming member 408.

Particularly, the collection body 406 is manufactured as one body by a single injection process, so that the manufacturing process is simple, a labor of an operator reduces, and manufacturing costs reduce. In the case where the collection body 406 is manufactured in an integral type, the first storing chamber 416, the second storing chamber 417, the first filtering chamber 423, the second filtering chamber 424, and the separation plate 437 are manufactured as one body by a single injection process. However, the separation plate 437 may be manufactured as a separate part and fixed in the collection body 406 depending on a detailed specification applied to the product.

The cover assembly includes a first cover 410 functioning as a main body of the cover assembly, second and third covers 409 and 412 respectively disposed in rear and front of the first cover 410, a cover fixing member 411 fixing the first and second covers 410 and 409. The cover fixing member 411 is designed to cover a portion of the first cover 410 to improve the outer appearance while simultaneously fixing the first and second covers 410 and 409.

Disposed in the dust collection boy 406 are a cone-shaped filter 405 and a blocking member 404 and airflow preventing plates 403. The cone-shaped filter 405 is provided to effectively filter the foreign objects when the cyclone airflows are generated. The blocking member 404 is disposed under the cone-shaped filter 405 to prevent the collected foreign objects from flying. The airflow preventing plates 403 are formed under the blocking member 404 to lower the airflow rate and to thereby allow the foreign objects to sink to the bottoms of the foreign object storing chambers.

The airflow preventing plates 403 and the blocking member 404 may be integrally formed with each other while the cone-shaped filter 405 may be provided as a separated part.

In addition, an opening/closing button 413 is provided on the first cover 410 and an opening/closing lever 414 having a first end contacting the opening/closing button 413 to pivot when the opening/closing button 413 is pushed. The opening/closing lever 414 has a second end contacting the first chamber sealing member 415. Therefore, when the opening/closing lever 414 is pushed, the opening/closing lever 414 pivots around a predetermined hinge point. When the second end of the opening/closing lever 414 moves away from the first chamber sealing member 415, the first chamber sealing member 415 rotates around a hinge point by its self-gravity and the foreign objects collected in the storing chambers 416 and 417 settled by their self-gravities.

In addition, the chamber sealing members 415 and 402 are designed to respectively seal the bottoms of the foreign object storing chambers 415 and 416. The first chamber sealing member 415 is hinge-coupled to the collection body 406 so that it can be opened by a pivotal motion when it is intended to throw away the foreign objects stored in the first chamber sealing member 415. A separation plate 437 for separating the first and second filtering chambers 423 and 424 from each other and defining an air passage is provided on a top surface of the collection body 406.

A plurality of guide ribs 456 are formed on an outer circumference of the collection body 406 to guide the insertion of the exhaust member 407 around the collection body 406. Each of the guide ribs 456 are gently rounded at an upper corner to effectively guide the insertion.

Figure 6:
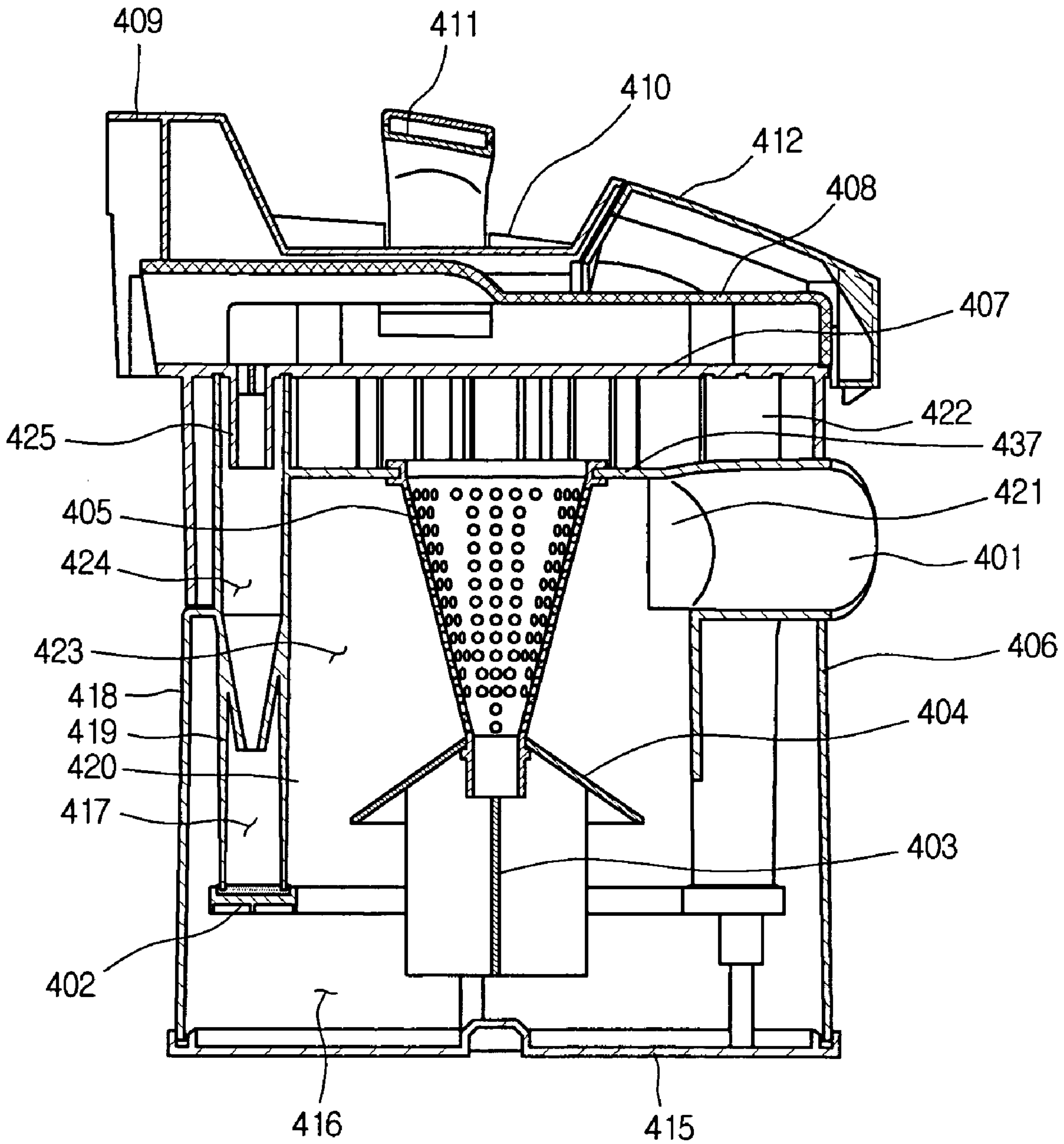
FIG. 6 is a sectional view taken along a line I-I' of FIG. 3.

FIG. 6 is a sectional view taken along a line I-I' of FIG. 3. The inner construction and the operation of the dust collecting unit 400 will be described in detail with reference to FIG. 6.

As described with reference to FIG. 5, the dust collection unit 400 includes the collection body 406, the chamber sealing members 402 and 415 provided to selectively seal the bottom of the collection body 406, the cone-shape filter 405 received in the collection body 406 to enhance the dust collection efficiency, the blocking member 404 preventing the foreign objects stored in the collection body 406 from flying, the airflow preventing plates 403 for lowering the airflow rate and for thereby allowing the foreign objects to sink to the bottoms of the foreign object storing chambers, the air exhaust member 407 disposed on the collection body 406 to guide the flow of the air exhausted from the collection body 406, the gap forming member 408 providing a predetermined gap above the exhaust member 407 to allow the air exhausted from the exhaust member 407 to flow in a direction, and covers 409, 410, 411, and 412 disposed on the gap forming member 408.

The collection body 406 includes the outer wall 418, the intermediate wall 419 and the inner wall 420. The outer wall 418 and the intermediate wall 419 are not formed on the portion where the second air intake hole 401 is formed, thereby allowing the air to be effectively introduced.

A space defined between the outer wall 418 and the intermediate wall 419 becomes the first storing chamber 416 and a space defined between the intermediate wall 419 and the inner wall 420 becomes the second storing chamber 417. An inner space defined by the inner wall 420 becomes the first filtering chamber 423. However, the functions of the spaces vary according to the shape of the dust correction unit 400.

The operation of the above-described dust collection unit will be described hereinafter with reference to the airflow.

The air is first introduced into the dust collection unit 400 through the second air intake hole 401. Here, an outer end of the second air intake hole 401 communicates with the front support 170 and an inner end of the second air intake hole 401 communicates with the first filtering chamber 423. A first air introduction guide 421 is projected inward from a portion of the inner wall 420, which defines the inner end of the second air intake hole 401, to guide the air in an inner circumferential direction of the first filtering chamber 423.

When the cyclone airflow is generated in the first filtering chamber 423, the foreign objects contained in the air are settled and the cleaned air is exhausted upward through pores of the cone-shaped filter 405. The second air exhaust hole 401 is formed corresponding to an upper portion of the cone-shaped filter 405, a relatively high RPM cyclone airflow is generated at the upper portion of the cone-shaped filter 405 and a relatively low RPM cyclone airflow is generated at a lower portion of the cone-shaped filter 405. This is the reason for forming the filter 405 in the cone-shape. That is, since a large amount of the foreign objects are forced outward in the relatively high RPM cyclone airflow and a large amount of the foreign objects are forced in the relatively low RPM cyclone airflow, it is preferable that the filter 405 is formed in the cone-shape.

The cone-shaped filter 405 may be detachably seated on a center of the separation plate 437 defining a top wall of the first filtering chamber 423. The cone-shaped filter 405 is typically provided with a plurality of pores through which the air passes.

The blocking member 404 is disposed under the cone-shaped filter 405 to prevent the settled foreign objects from flying. The blocking member 404 has a diameter that is increased as it goes downward to prevent the foreign objects from flying in a reverse direction.

The airflow preventing plates are disposed under the blocking member 404 at a predetermined gap to prevent the cyclone airflow form reaching the settled foreign objects, thereby basically preventing the settled foreign objects from flying.

The foreign objects filtered in the first filtering chamber 423 are stored in the first storing chamber 416 formed under the first filtering chamber 423. A bottom of the first storing chamber 416 is sealed by the first sealing member 415. The air introduced passes through the first filtering chamber 423, in the course of which the relatively large-sized foreign objects contained therein are filtered, and is then directed to the separation plate 437 through the cone-shaped filter 405. Therefore, in order to filter micro-scale foreign objects, additional cyclone airflow is further required. The secondary cyclone airflow will be described in more detail hereinafter.

The air passing through the cone-shaped filter 405 is introduced into the second filtering chambers 424 through a second air introduction guide 422. Since the second air introduction guide 422 faces the inner circumference of the second filtering chambers 424 in a tangent direction, the cyclone airflow is generated in the second filtering chamber 424.

The foreign objects filtered in the second filtering chambers 424 by the cyclone airflow are settled in the second storing chamber 417. In order to prevent the settle foreign objects from flying, a width of each of the lower portion of the second filtering chambers 417 are narrowed. In addition, in order to prevent the settled foreign objects from leaking, a bottom of the second storing chamber 417 is sealed by the second chamber sealing member 402.

The second chamber sealing member 402 has a bar-shaped connection structure to be connected to the first chamber sealing member 415, thereby increasing an inner volume of the first storing chamber 416. That is, since the foreign objects are stored in the space defined between the lower end of the second chamber sealing member 402 and the upper end of the first chamber sealing member 415, it is preferable that the connection structure is formed in a bar-shape that can occupy a small space.

The air whose foreign objects are filtered in the second filtering chamber 424 is introduced into the exhaust member 407 via an exhaust side air intake hole 425 and collected in a space between the exhaust member 407 and the gap forming member 408. Here, a diameter of the exhaust side air intake hole 425 is less than an inner diameter of the second filtering chamber 424 so as to prevent the foreign objects in the second filtering chamber 424 from being directed to the exhaust member 407.

The air whose foreign objects are filtered in the first and second filtering chambers 423 and 424 by the cyclone airflows is directed to the motor and then exhausted through the rear surface of the main body 100.

Also, the cover assembly is further formed on an upper portion of the gap forming member 408. The cover assembly includes the first cover 410, the second and third covers 409 and 412 covering the rear and front portions of the fist cover 410, and the cover fixing member 411 fixing the second cover 409 to the first cover 410.

In the meantime, the present invention has one characteristic that the collection body 406 is manufactured as one body by a single injection process. The construction of the collection body will be described in detail below.

Figure 7:
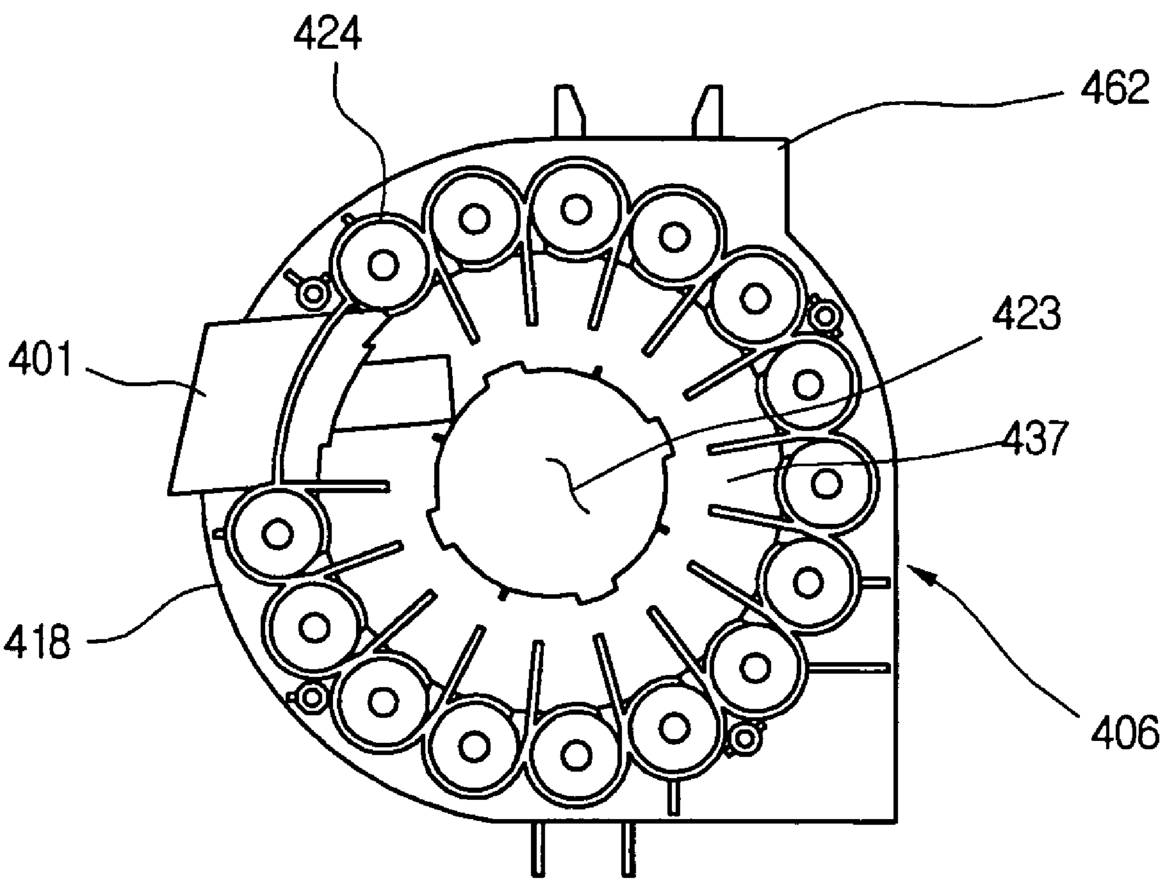
FIG. 7 is a plan view of a collection body in a dust collecting unit according to the present invention.

FIG. 7 is a plan view of a collection body in a dust collecting unit according to the present invention. Referring to FIGS. 5 and 7, the collection body 406 is cylindrical shaped as a whole and has the first storing chamber 416, the second storing chamber 417, the first filtering chamber 423, the second filtering chamber 424, and the separation plate 437, each of which is integrally formed as one body in the collection body 406. Also, an edge portion 462 is formed at least one point of the outer wall 418 constituting the outer boundary of the first storing chamber 416 and the gap forming member of the second storing chamber 417.

The edge portion 462 allows the foreign objects to gather therein by having swirl produced from airflow rotating in the inside of the first storing chamber 416. The interval between the outer wall 418 and the second storing chamber 417 is spaced more than a predetermined distance, so that a mold used in injection process of the collection body 406 is manufactured in a more than a predetermined thickness, which increases stability of the mold.

Figure 8:
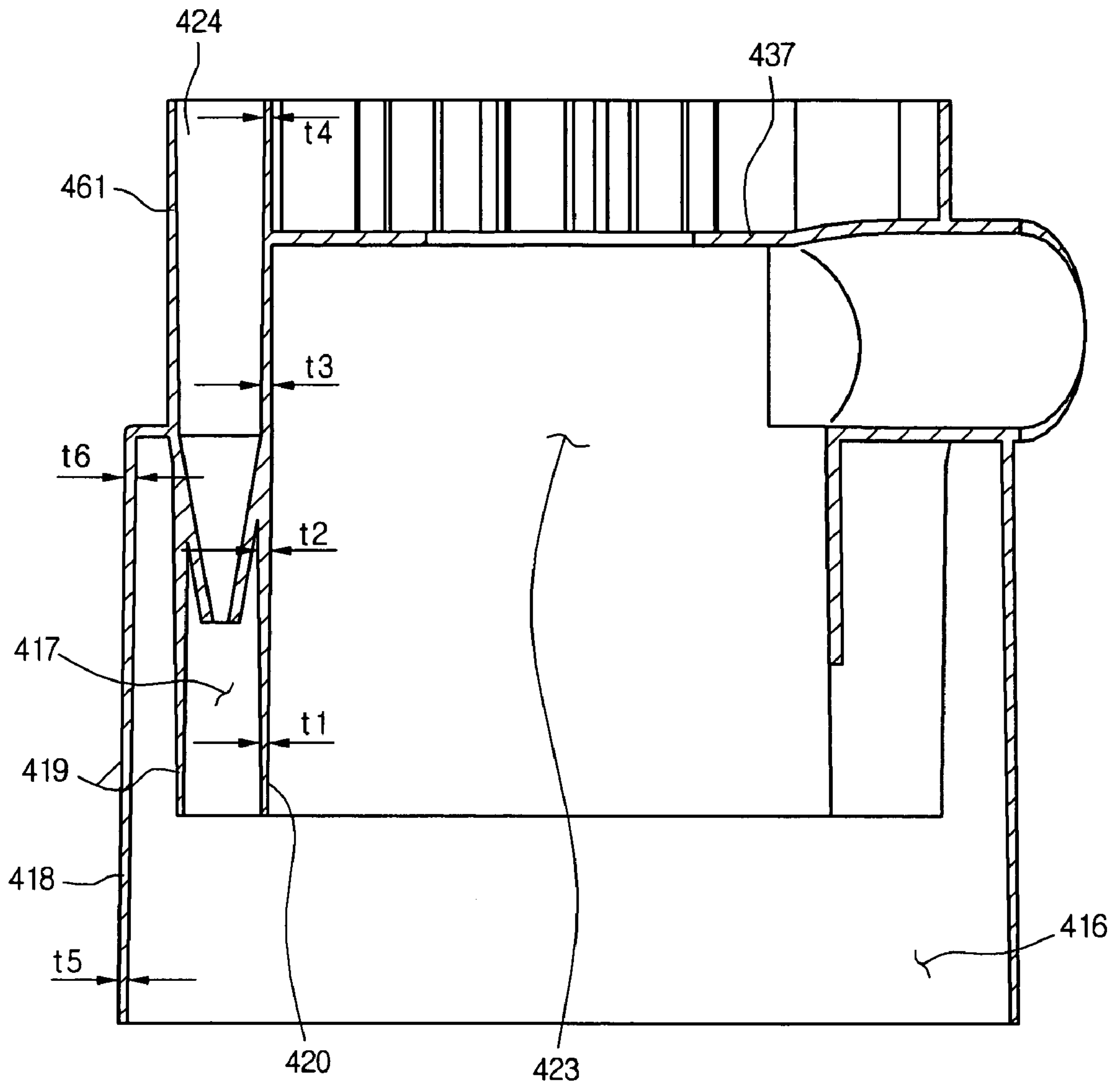
FIG. 8 is a vertical sectional view of a collection body in a dust collecting unit according to the present invention.

FIG. 8 is a vertical sectional view of a collection body in a dust collecting unit according to the present invention.

Referring to FIG. 8, the collection body 406 has the first filtering chamber 423 provided in a lower side of the separation plate 437 and the tubular second filtering chamber 424 extending to the upper side from the separation plate 437, each of which is integrally injection-molded as one body. Also, The tubular second storing chamber 417 extending to the lower side from the separation plate 437 and the first storing chamber 416 formed in the inner space of the outer wall 418 extending to the lower direction from the outer periphery of the separation plate 437 are integrally injection-molded as one body.

According to another aspect of the present invention, the second storing chamber 417 is formed in a space between the inner wall 420 and the intermediate wall 419, and the first filtering chamber 416 is formed in the inner space of the outer wall 418. Also, the second filtering chamber 423 is defined as the inner space of the second filtering chamber wall 461 extending to the upper direction of the separation plate 437.

In the meantime, the injection process by the mold should be swiftly performed so that the collection body 406 may be injection-molded as an integral type. In detail, the upper portion above the separation plate 437 is manufactured by a mold removing upward and the lower portion below the separation plate 437 is manufactured by a mold removing downward.

Therefore, the filtering chamber wall 461, the inner wall 420, the intermediate wall 419, and the outer wall 418 should taper as they go to their end from their base.

In other words, the thickness t2 of a base of the inner wall 420 and the intermediate wall 419 is thicker than the thickness t1 of an end thereof so as to prevent interference between the body portion of the injected collection body 406 and the mold when the injection is completed and the mold is removed. Likewise, the thickness t3 of a base of the second filtering chamber wall 461 and the thickness t6 of a base of the outer wall 418 should be thicker than the thicknesses t4 and t5 of their ends, respectively.

However, since the shrinking opening at the lower side of the second filtering chamber 461 tapers in itself, the thickness thereof don't need to be changed.

As described above, the collection body 406 of the dust collecting unit is manufactured in an appropriate shape for reliable performance of the manufacturing process.

Operation of the dust collecting unit 400 and the whole operation of the vacuum cleaner main body 100 will be described in detail with reference to FIG. 9 which is a longitudinal sectional view of the vacuum cleaner.

Figure 9:
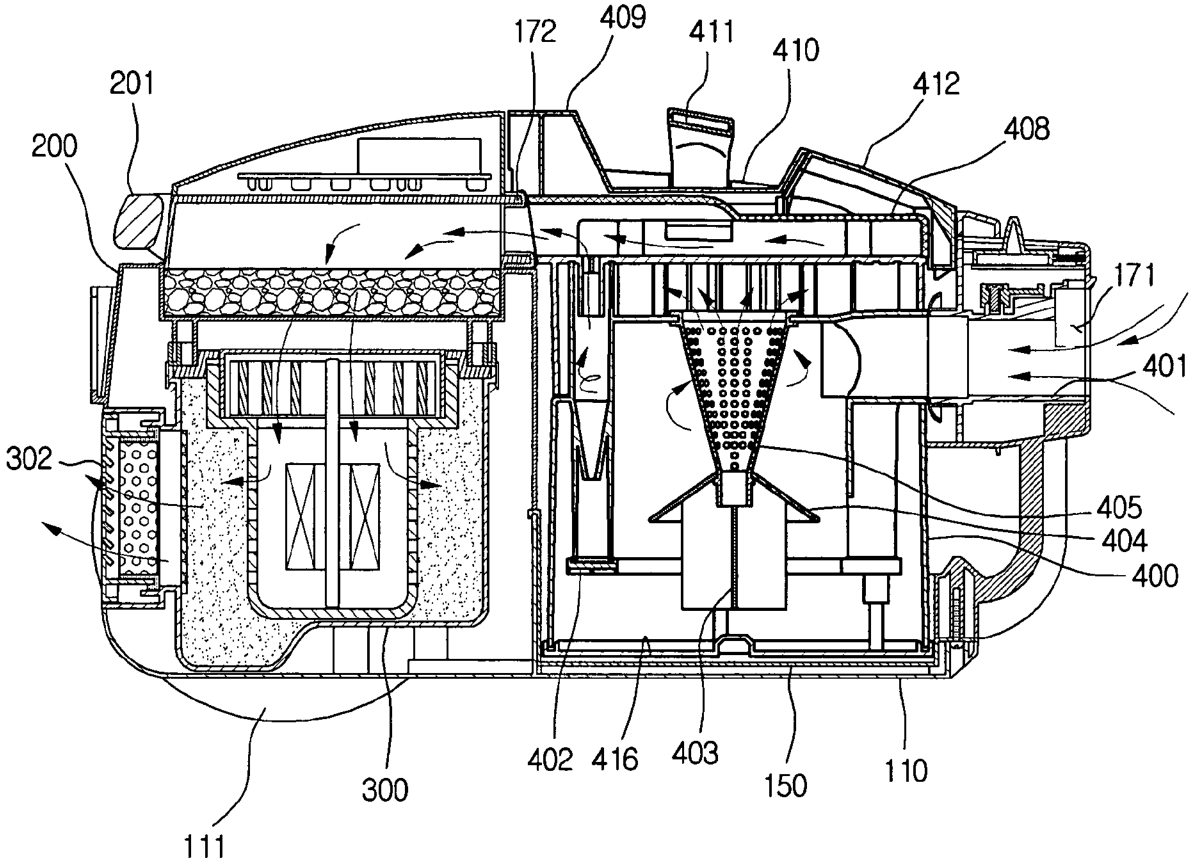
FIG. 9 is a longitudinal sectional view of a vacuum cleaner according to the present invention.

Referring to FIG. 9, outside air flows into the main body 100 through the suction port 171 at the side of the main body connected with the connector 6, and flows into the duct collecting unit 400 through suction port 401 at the side of the dust collecting unit. After foreign objects is filtered by the above-described operation and action in the inside of the dust collecting unit 400, the air flows into the motor housing 300 through the suction port 172 at the side of the motor.

At this point, the motor housing 300 stands vertically and an inlet thereof faces upward. Accordingly, the air that has passed through the dust collecting unit 400 and flowed horizontally changes its progress direction to flow downward. After the air passes through the motor housing 300, the air is discharged to the outside through the exhaust port 302 provided in the backside of the main body 100.

As described above, according to the dust collecting unit of the vacuum cleaner, the plurality of parts are manufactured simply using a few integral type part, so that the manufacturing process is simplified and the manufacturing costs and time are reduced.

Also, since the dust collecting unit has the plurality of parts manufactured in an integral type through a single injection process, the accuracy of the product improves.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A dust collecting unit of a vacuum cleaner, comprising:

a collection body having a plurality of foreign object filtering chambers for filtering foreign objects and a plurality of foreign object storing chambers for storing foreign objects filtered from the foreign object filtering chambers;

a sealing member for closing a lower portion of the collection body; and a separation plate formed horizontally at the collection body and having an exhaust member disposed at an upper side of the collection body, the exhaust member guiding airflow;

wherein the plurality of foreign object filtering chambers comprises:

a first foreign object filtering chamber disposed in an inner space of an inner wall extending to a downward direction of the separation plate; and at least one second foreign object filtering chamber provided at an outer side of the first foreign object filtering chamber; and wherein the plurality of foreign object storing chambers comprises:

a second storing chamber defined as a space between the inner wall and an intermediate wall spaced at an outside of the inner walk; and a first storing chamber defined as an inner space of an outer wall spaced at an outside from the intermediate wall; and wherein the first and second foreign object filtering chambers and the first and second foreign object storing chambers are formed as one body.

2. The dust collecting unit according to claim 1, wherein the inner wall and/or the intermediate wall and/or the outer wall have a thickness tapering toward a lower portion.

3. The dust collecting unit according to claim 1, wherein the second filtering chamber has a wall whose thickness tapers toward an upward direction.

4. The dust collecting unit according to claim 1, wherein the outer wall constitutes an outer wall of the dust collecting unit.

5. The dust collecting unit according to claim 1, wherein a lower end of the second foreign object filtering chamber is received in an inside of the second foreign object storing chamber.

6. The dust collecting unit according to claim 1, further comprising a gap forming member formed on an upper side spaced a predetermined distance from the exhaust member, for guiding air discharged from the second foreign object filtering chamber to one direction.

7. The dust collecting unit according to claim 1, wherein at least one point of the outer wall is angled to form an edge portion for collecting foreign objects.

8. The dust collecting unit according to claim 1, further comprising a filter made of plastic, disposed in an inside of the first foreign object filtering chamber, and having a plurality of openings, for collecting foreign objects.

9. The dust collecting unit according to claim 1, wherein the separation plate is injection-molded integrally with the plurality of foreign object filtering chambers.

10. The dust collecting unit according to claim 1, wherein the collection body is injection-molded as one body.

11. A dust collecting unit of a vacuum cleaner comprising:

a separation plate for portioning a space horizontally;

a collection body having, as one body;

a first foreign object filtering chamber formed in a lower side of the separation plate and having an upper wall defined by the separation wall;

a plurality of second foreign object filtering chambers formed at an outside of the first foreign object filtering chamber;

a first foreign object storing chamber formed in a lower portion of the first foreign object filtering chamber; and a single foreign object storing chamber formed in a lower portion of the second foreign object filtering chambers;

a filter fixed as a separate member at a central portion of the separation plate;

a blocking member formed in a lower side of the filter, for partitioning the first and second foreign object storing chambers; and an exhaust member for guiding airflow discharged from the foreign object filtering chamber.

12. The dust collecting unit according to claim 11, wherein the separation plate is formed integrally with the collection body.

13. The dust collecting unit according to claim 11, wherein the filter is made of solid plastic having an opening.

14. The dust collecting unit according to claim 11, wherein a chamber opened upward among the chambers has a wall whose thickness tapers toward an upward direction.

15. The dust collecting unit according to claim 11, wherein a chamber opened downward among the chambers has a wall whose thickness tapers toward a downward direction.

16. The dust collecting unit according to claim 11, wherein the collection body is injection-molded.

17. The dust collecting unit according to claim 11, further comprising a gap forming member formed in an upper side of the exhaust member, for guiding airflow discharged from the collection body to one direction.

18. A dust collecting unit of a vacuum cleaner comprising:

a collection body having, as one body;

a separation plate for portioning a space horizontally;

a first foreign object filtering chamber formed in a lower side of the separation plate and having an upper wall defined by the separation wall;

a plurality of second foreign object filtering chambers formed at an outside of the first foreign object filtering chamber;

a first foreign object storing chamber formed in a lower portion of the first foreign object filtering chamber; and a single foreign object storing chamber formed in a lower portion of the second foreign object filtering chambers;

a communication cavity formed in a central portion of the separation plate and through which air from which foreign objects have been filtered by the first foreign object filtering chamber is discharged;

a filter for filtering relatively large foreign objects in air discharged from the communication cavity;

a blocking member formed in a lower side of the filter, for partitioning the first and second foreign object storing chambers; and an exhaust member for guiding airflow discharged from the foreign object filtering chamber.

19. The dust collecting unit according to claim 18, wherein the collection body is injection-molded in an integral type and each of the chambers has a wall whose thickness tapers toward a direction of an opening.

* * * * *